Figures 1, 2:
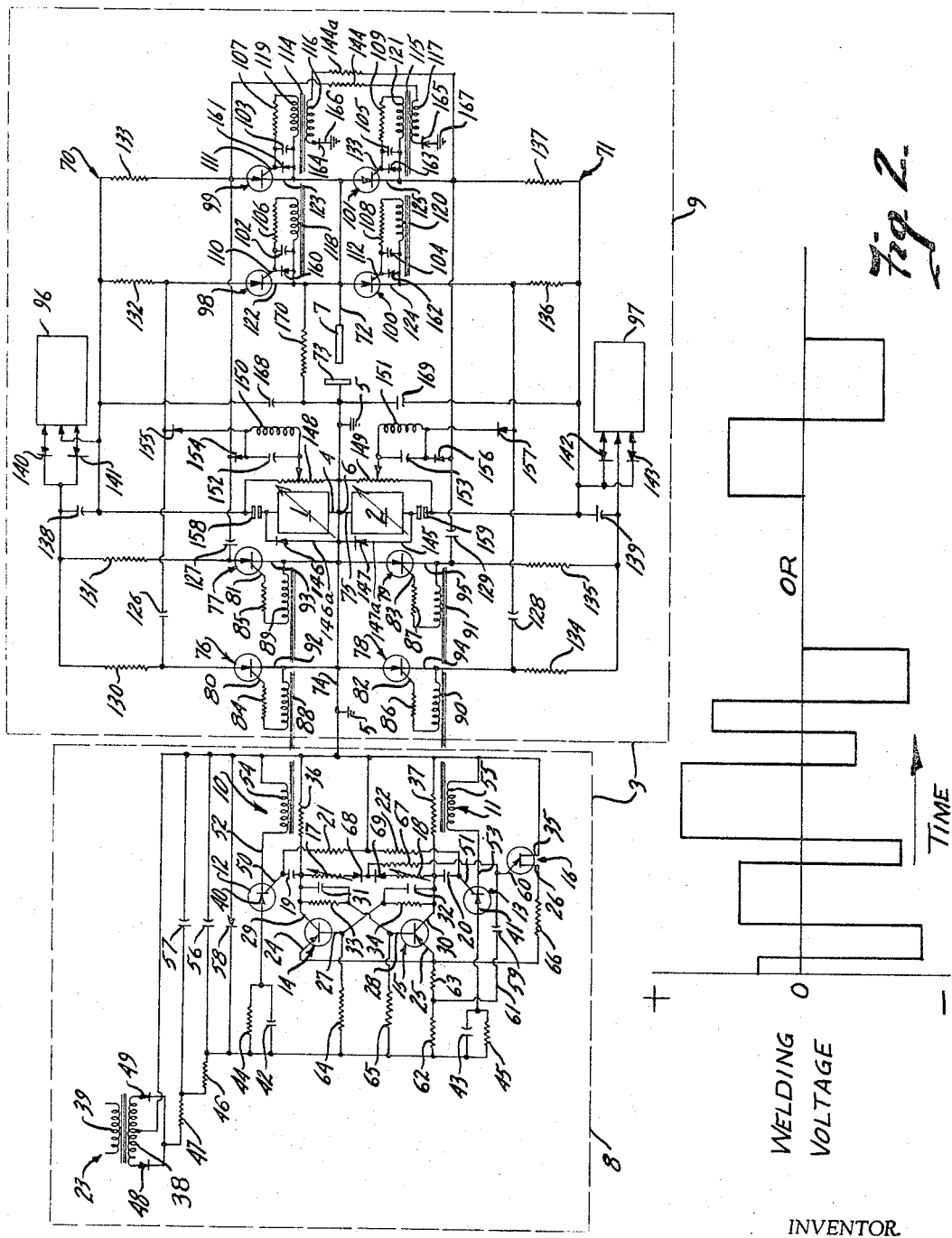

July 11, 1967 J. R. MAKLARY 3,330,933
CONTROLLED RECTIFIER WELDING POWER SOURCE
Filed April 7, 1964

INVENTOR.
JOSEPH R. MAKLARY

United States Patent Office 3,330,933
Patented July 11, 1967

3,330,933
CONTROLLED RECTIFIER WELDING POWER SOURCE
Joseph R. Maklary, Milwaukee, Wis., assignor, by mesne assignments, to Harnischfeger Corporation, West Milwaukee, Wis., a corporation of Wisconsin
Filed Apr. 7, 1964, Ser. No. 357,948
10 Claims. (Cl. 219—131)

This invention relates to a controlled rectifier power source, and more specifically to a power source which produces an alternating polarity, square wave current for arc welding. The power source includes a control circuit for rapidly switching positive and negative current pulses to the welding electrode to modify the electrical characteristics of the arc, thereby providing more precise electrical control of the welding arc than was heretofore possible. This power source can be used with a wide variety of electrodes, and for a large number of different welding applications, because the duration and amplitude of the positive and negative current pulses of the output can be changed easily to fit particular welding conditions.

This power source inherently provides a steep wave front, because it employs high-speed controlled rectifiers for switching from positive to negative polarity current condition. Arc reignition, therefore, is accomplished without requiring an auxiliary arc reignition circuit, since the voltage switches from full negative to full positive in less than 20 miscroseconds. For some electrode wires, the rapid switching time is not required, but it has been discovered that certain D.C. electrodes, which could not be used on A.C. can now be used successfully with the power source of the invention. Magnetic arc blow is eliminated, weld penetration is closely controlled, and the weld deposition rate is substantially increased as compared to direct current reverse polarity welding by the welding method of the invention.

Various circuits have been proposed in the past to provide a positive and negative half cycle in an A.C. power source, but when applied to arc welding, auxiliary means have been required for starting and reigniting the arc each half cycle. In addition, most of these other power sources have been used only for non-consumable electrode arc welding, and usually with argon shielding gas.

The present invention specifically contemplates the use of two constant potential, D.C. power supplies connected into a control circuit at opposite polarities in such a way that they can be connected to the welding electrode sequentially to produce predetermined adjustable, square wave current pulses at variable, predetermined voltages governed by the control settings or "program" of the control circuit. The control circuit of the invention includes a positive and negative half, and each half includes a plurality of small paralleled "turn-off" controlled rectifiers, circuits associated with a plurality of parallel, larger load current controlled rectifier circuits, each load current controlled rectifier having its gate associated with the secondary winding of a pulse transformer, and through a commutating capacitor, connected to one of the respective "turn-off" controlled rectifiers. Each pulse transformer is connected to receive a signal from a "master" load current controlled rectifier in the opposite polarity side of the circuit. When the "master" load current controlled rectifier is turned off by its associated turn-off SCR, a pulse is generated to turn on the opposite polarity "master" load current controlled rectifier. The back bias voltage for turning a load SCR off is provided by the discharge of a capacitor. The capacitor discharge is caused by the turn-on of the smaller "turn-off" controlled rectifiers, which are signalled from a trigger pulse transformer in a smaller trigger circuit.

The interconnection of the positive and negative load current controlled rectifiers in the manner described is an important feature of the invention. The positive and negative halves of the load circuits are electrically interconnected so that the turn-off signal for the positive load current controlled rectifiers provides the turn-on signal for the negative load current controlled rectifiers, and vice versa, thereby enabling rapid switching. A plurality of the load current controlled rectifier circuits are paralleled in the circuit for greater current carrying capacity. It is possible to parallel any required number of load current controlled rectifiers when they are arranged in the manner of the invention.

Each of the load current controlled rectifiers has a smaller "turn-off" controlled rectifier associated with it in the circuit. The "turn-off" controlled rectifiers cause their respective load current controlled rectifiers to turn off. The circuit is arranged so that each "turn-off" controlled rectifier is triggered by a signal from a pulse transformer on the trigger circuit network. When the "turn-off" controlled rectifiers conduct, they apply a charged commutating capacitor to their respective load current controlled rectifiers, back biasing them for the time required for charge carriers to clear the SCR junctions. This action also enables a pulse transformer to provide a turn-on pulse for the opposite polarity load current controlled rectifiers. This action is sequential, that is, the back biasing must come before opposite polarity turn on, thereby preventing both polarities from conducting at the same time.

One of the problems with the use of controlled rectifiers for controlling the amplitude and duration of any constant potential power source is the fact that the controlled rectifier can be turned on very readily, but requires either a back bias voltage, or a complete switch-off of its load current to turn it off.

The controlled rectifier welding power source of the invention switches from one polarity to the opposite and comes to peak voltage so rapidly that a square wave shape is produced. The adjustments of the trigger circuit provide means to control the duration of each positive and negative current pulse produced by the power source. The duration of the positive and negative half cycles can be varied independently, and each successive pulse can be varied according to any desired program sequence to meet specific welding requirements. The turn-off of one polarity of the composite power source automatically triggers the "turn-on" of the opposite polarity conducting period. The voltage of each power source can be varied independently also, as well as the current, by adjusting the individual power source settings.

The independent and infinitely variable controlled output has enabled the development of new welding processes utilizing the square wave current output.

In prior arc welding methods, attempts have been made to solve the AC welding arc instability problem by means of special electrode formulations, auxiliary DC power supplies and other arc restrike means. Such devices were required, because the power source wave forms were sinusoidal. With such a wave form, the potential across the arc remains low for a long enough period to extinguish the arc. With applicants' square wave, the potential passes through zero so quickly that arc reignition takes place readily. A.C. welding with bare steel electrodes is made possible with the circuit of the invention with no added emissive materials, auxiliary arc starting circuit, or other arc restrike means.

In addition, proper sequence programming of the power pulses has made possible a completely new concept in welding methods. Prior to this invention, a relatively skilled manual weldor was required to perform good quality out-of-position welds. By using the programmed sequence of the invention, even an amateur can make good out-of-position welds, either vertical or overhead.

The amateur weldor simply follows instructions for setting the control circuit to a particular control sequence and strikes an arc, maintaining the arc electrode at a predetermined position and direction of travel with regard to the workpiece. The power source automatically provides the proper current and heat input to the work as welding progresses. In effect, the programmed power source accomplished the welding results which are otherwise accomplished by the weaving motion characteristic of an expert weldor. Proper current peaks are provided for driving the metal home under those conditions when it is necessary, and the circuit may also be adjusted for effective cathodic cleaning.

The drawings furnished herewith illustrate the best mode presently contemplated for carrying out the invention.

In the drawings:

FIGURE 1 is a schematic diagram showing the power source used in the method of the invention; and FIGURE 2 is a voltage/time graph illustrating the rapid rise time characteristic and the infinitely variable control which can be programmed into the power source of FIGURE 1.

The controlled rectifier power source of the invention basically comprises a positive DC power source 1, a negative DC power source 2, and a control circuit 3 for alternately switching the load between power sources, rapidly, in any predetermined schedule. The power sources 1 and 2 are each standard constant potential transformer rectifier units, rated at 600 amps full duty cycle and 55 volts open circuit. Units 1 and 2 are provided with voltage and amperage adjustment means, as indicated by the arrows in FIG. 1. The adjustment means may take the form of a program control units of any well known type, such as a pre-programmed tape connected to an electric servomotor system which automatically adjusts the corresponding power source in response to signals from the program means. Other electro-mechanical means can be used to program the voltage and current supplied from the power sources 1, 2 to meet specific welding conditions, and their use in combination with applicant's invention is readily apparent to those skilled in the art. Power source 1 is connected with its negative pole 4 to common ground 5, while power source 2 has its positive pole 6 connected to ground 5. By connecting the power sources 1 and 2 in this manner to control circuit 3, a square wave AC can be synthesized from the rapid alternate on-off switching of the DC power sources 1 and 2 through a welding electrode 7 with which the power sources are connected through the control circuit 3.

The control circuit 3 comprises a conventional pulse transformer trigger circuit 8, such as shown in FIG. 1, and a novel controlled rectifier switching circuit 9.

The switching circuit 9 is an important feature of the invention, and provides means to positively switch the load between power sources 1 and 2 at switching speeds in the order of five to twenty microseconds. The switching circuit 9 fully utilizes the high switching speeds of controlled rectifiers so that any desired program of square waves, variable width AC pulses, examples of which are shown in FIG. 2 of the drawings, may be formed.

In the following description of the control circuit 3, the controlled rectifiers will be referred to by the letter designation "SCR," which in the usual sense, refers to a controlled rectifier having NPNP junctions comprising silicon. However, it is contemplated by applicants that other types of controlled rectifiers can be substituted in the circuit, provided the response time is sufficiently fast.

The pulse transformer trigger circuit 8 comprises a pair of pulse transformers 10 and 11 which deliver signals alternately to the opposite polarity portions of the switching circuit 9. The trigger circuit 8 is similar to the timing circuit illustrated and described at page 200 of the General Electric "Transistor Manual," sixth edition of the above reference, to produce a variable adjustment to the square wave output signal. The trigger circuit is also described generally in U.S. Patent 3,075,136 issued on Jan. 22, 1963, to D. V. Jones. The circuit has been further modified by the addition of two booster SCR's 12, 13 to insure sufficient signal strength to pulse transformers 10, 11 for multiple SCR firing.

The pulse transformer trigger circuit 8 comprises a cross-coupled flip-flop circuit including transistors 14, 15, unijunction transistor 16, adjustable potentiometers 17, 18, coupling capacitors 19, 20, and resistors 21, 22. The trigger circuit 8 is electrically connected to a transformer 23. The potentiometers 17 and 18 have been shown as adjustable in the drawing to ilustrate that they are capable of being programmed by any well known sequence programming device, such as a magnetic tap or the like, which is operatively connected to adjust the potentiometers 17, 18 in accordance with a predetermined program sequence.

The transistors 14, 15 are gating transistors for diode capacitor type gate steering. Each transistor 14, 15 has its emitter 23, 25, connected to base two electrode 26 of unijunction transistor 16, and base one electrode 27, 28 of transistor 14, 15 is cross-coupled to the opposite transistor 15, 14 and collector 29, 30 through a cross-coupling capacitor 31, 32 and cross-coupling resistor 33, 34 disposed in parallel.

The base one leg 35 of the unijunction transistor 16 is also parallel connected to the collectors 29, 30 through resistors 36, 37 and center tap connected to the secondary 38 of supply transformer 23. Primary 39 of transformer 23 is connected to a source of 110 v., 60 cycle alternating current (not shown).

Anode 40, 41 of booster SCR 12, 13 is connected to a switching capacitor 42, 43 having a resistor 44, 45 disposed in parallel therewith and from there, back to transformer secondary 38, through resistors 46, 47 and blocking diodes 48, 49. Gate 50, 51 of booster SCR 12, 13 is connected to coupling capacitor 19, 20, resistor 21, 22, and to the regulating potentiometer 17, 18. Base 52, 53 of SCR 12, 13 is connected to primary 54, 55 of pulse transformer 10, 11.

Capacitor 56, 57 is disposed in parallel with the power supply of circuit 8, and in series with resistance 46. 47, respectively, which is center tapped to secondary 38. A zener diode 58 is also provided in parallel with capacitor 56, 57 to provide a steady D.C. source for the trigger system.

A timing capacitor 59 is connected in series with emitter 60 of unijunction transistor 16. Capacitor 59 is connected through lead 61 between a small resistor 62 and a larger resistor 63. The resistor 63 is connected to the emitter 25 of transistor 15 at its other terminal. Small resistors 64, 65 are included between the base one electrodes 27, 28 of transistors 14, 15 and the secondary 38 of transformer 23. A resistor 66 is disposed in series between the base two electrode 26 of unijunction transistor 16 and the emitter 24 of PNP transistor 14. Another resistor 67 is disposed in series with emitter 60 of unijunction transistor 16, and is connected between two silicon diode rectifiers 68, 69.

In operation, a direct current energizing signal is supplied through transformer 23, rectifiers 48, 49, R-C filters 46, 56 and 47, 57, resistor 62, and timing capacitor 59 to the emitter 60 of the unijunction transistor 16. Base one leg 35 of unijunction transistor 16 is at ground potential, and a positive bias voltage appears at base two leg 26 through resistor 63 from transformer 23. When timing capacitor 59 discharges, the emitter voltage exceeds the voltage appearing at the base two leg 26, the emitter 60 becomes forward biased and a negative current pulse flows to the collector 24, 25 of PNP transistor 14, 15, depending on their condition at the particular instant of time. The signal to collector 24, 25 causes the transistor 14, 15 to conduct, supplying a turn-off signal for the opposite transistor 14, 15 through resistor 33, 34 and capacitor 31, 32 and supplying a gate signal to turn on the associated booster SCR 12, 13 through coupling capacitor 19, 20 and coupling resistor 21, 22. When transistor 14, 15 conducts, it also completes the circuit through variable potentiometer 17, 18, diode 68, 69, and resistor 67 to emitter 60 of unijunction transistor 16 so that the cycle may be repeated in typical flip-flop, bistable multi-vibrator operation. The particular square wave generator shown can be varied in pulsed width by independent adjustment of the potentiometers 17 and 18.

The gate signal to booster SCR 12, 13 triggers full rated current conduction of SCR 12, 13 through switching capacitor 42, 43 and switching resistor 44, 45 to provide a signal pulse to primary 54, 55 of pulse transformer 10, 11.

Booster SCR 12, 13 is turned off when the anode current drops below the SCR minimum holding current, due to nearly charged capacitor 42 or 43. When the SCR turns off, capacitors 42 or 43 will be discharged to zero with resistor 44 or 45. The SCR is now ready to receive the next gate pulse from the transistor bistable multivibrator.

The pulse signal transmitted through pulse transformer 10, 11 provides accurate triggering means for the power source control circuit 3 to switch the load between power sources 1 and 2.

Control circuit 3 includes a positive voltage network 70 and a negative voltage network 71 which allow power sources 1 and 2, respectively, to synthesize a square wave, alternating current through the welding electrode 7, which is connected through common lead 72 to networks 70 and 71.

An alternating polarity arc is struck through a workpiece 73, which is held at zero potential through common ground 5, and a common ground conductor 74, which is connected between power sources 1 and 2 to the negative pole 4 of power source 1 and positive pole 75 of power source 2.

The positive network 70 and the negative network 71 are identical in function but opposite in polarity. Network 70, 71 is triggered through pulse transformer 10, 11.

Network 70, 71 includes a plurality of small turn-off SCR's 76, 77 (78, 79), each having its gate 80, 81 (82, 83) connected across a resistor 84, 85 (86, 87) to a secondary winding 88, 89 (90, 91) of pulse transformer 10, 11. The other end of secondary winding 88, 89 (90, 91) is connected to cathode lead 92, 93 (94, 95) of turn-off SCR's 76, 77 (78, 79).

A suitable constant potential auxiliary power source 96, 97 is provided to assure full charging of commutating capacitors 126, 127 (128, 129). When the capacitors 126, 127 (128, 129) are fully charged, they will be caused to discharge when the associated turn-off SCR's 76, 77 (78, 79) conduct. The turn-off SCR's 76, 77 (78, 79) conduct when their gates 80, 81 (82, 83) receive a pulse from the associated pulse transformer 10, 11. This turn-on signal pulse for the SCR's 76, 77 (78, 79) originates in the pulse transformer trigger circuit 8.

Therefore, in this way, SCR's 76, 77 (78, 79) control the turn-off of their associated load SCR's 98, 99 (100, 101), because when SCR's 76, 77 (78, 79) conduct, capacitors 126, 127 (128, 129) cause a reverse potential to appear across the associated load SCR's 98, 99 (100, 101), thereby shoving their anodes negative with respect to their cathodes. Capacitors 126, 127 (128, 129) and auxiliary power source 96, 97 are selected to provide a back biasing voltage of sufficient duration to assure turn-off of the associated load SCR's 98, 99 (100, 101), because it is imperative that one-half of the circuit be turned off before the other half is permitted to conduct to avoid destruction of the SCR's.

Turn-on of the load SCR's (100, 101) 98, 99 is accomplished by means of a load pulse transformer 114, 115 having its primary 116, 117 associated with one of the opposite polarity load SCR's 101, 99, and with the turn-off SCR's 76, 77 (78, 79). Secondary windings 118, 119 (120, 121) are connected across cathodes 122, 123 (124, 125) of the load SCR's 98, 99 (100, 101) and when the respective turn-off SCR's 76, 77 (78, 79) conduct, a turn-on signal is automatically provided to turn on the opposite polarity load SCR's just as the conducting load SCR's are being back biased to turn them off. At this instant, load switching is accomplished without waiting for charge carriers to clear junctions of the SCR that is being turned off.

Each turn-off SCR 76, 77 (78, 79) has a capacitor 126, 127 (128, 129) connected to its load SCR 98, 99 (100, 101) in such a manner that conduction of the turn-off SCR will place the charge in the capacitor across its associated load SCR, making the anode negative with respect to its cathode. Current limiting resistors 130, 131, 132, 133 (134, 135, 136, 137) are provided between the power source 96, 97, the turn-off SCR's 76, 77 (78, 79) and the load SCR's 98, 99 (100, 101). Capacitor 138, 139 is provided in series between the auxiliary power source 96, 97 and main power source 1, 2. Also, auxiliary power source 96, 97 includes rectifier diodes 140, 141 (142, 143). A current limiting resistor 144, 144a is also provided between the transformer 114, 115 and the capacitor 127, 129 to protect the transformer 114, 115 and the SCR gates 110, 111 (112, 113) from excessive current surges. A rectifier diode 146, 147 is provided in a shunt circuit 146a, 147a around power sources 1 and 2, to prevent voltage reversal during fast transients.

Voltage adjustment of power sources 1 and 2 is accomplished independently by means of the conventional controls provided with them (not shown). Resistor 148, 149 is connected through an overload coil 150, 151 in parallel with a pair of small rectifier diodes 154, 155 (156, 157), and is part of the overload protection circuit.

Main power sources 1 and 2 can also be turned on and off by means of main contactors 158, 159.

Zener diodes 160, 161 (162, 163) are provided at the gates 110, 111 (112, 113) in parallel with the filtering capacitor 102, 103 (104, 105) to prevent transient voltages from erroneously signaling the load SCR 98, 99 (100, 101) and to limit the gate voltage to the zener voltage. Small diodes 164, 165 are provided between ground 166, 167 and the primary 116, 117 of pulse transformer 114, 115. Capacitance 168, 169 is connected from common ground lead 74 and ground 5 to power source 1, 2 through contacts 158, 159.

It is, of course, contemplated that the above described circuit could be modified and still provide a power source which can be rapidly switched from one polarity to the opposite to produce a square wave, alternating current most suitable for arc welding.

The operation of the trigger circuit 8 has been described above. The operation of the control circuit 3 will now be described.

The main control circuit 3 is energized by closing contacts 158, 159 energizing power sources 1, 2, which in turn energize power sources 96, 97. Pulses received through pulse transformer 10, 11 trigger the respective gates of turn-off SCR's 76, 77 (78, 79).

When turn-off SCR's 76, 77 (78, 79) conduct, they connect capacitors 126, 127 (128, 129) to their associated load SCR's 98, 99 (100, 101) back biasing them, and causing them to turn off. The same signal which turns off the load SCR's 98, 99 (100, 101) automatically provides a turn-on pulse through pulse transformer 114, 115 and diodes 164, 165 to turn on the opposite load SCR's 100, 101 (98, 99). When the load SCR's 98, 99 (100, 101) conduct load current, they complete an electrical circuit through the power source 1 (2), resistor 132, 133 (136, 137) and through electrode 7, thereby providing an alternating square wave electric current to electrode 7. The electrode 7 is disposed close enough to workpiece 73 to establish an alternating current arc therebetween.

Applicant has discovered that excellent welding results can be obtained with an alternating current, square wave welding power source. The manipulation of the positive and negative pulse duration compensates for many problems found in straight direct current welding. Also, various vare steel electrodes, which could not be used with alternating current power sources at all, can now be used very effectively with applicant's rapid rise time, square wave power source.

The rise time is critical in re-establishing the arc after the arc outage period when the current and voltage goes through zero on each cycle. The rise time obtainable with the above described circuit falls well within the range of 5–20 microseconds from zero to full on. Applicant has found that the rise time range will permit welding even with the most difficult and unstable electrodes.

Other benefits in the way of increased deposition rate, more stable welding arc, better and smoother weld deposits, have been accomplished by means of the invention.

The "power concept" of arc welding disclosed in this invention makes it possible to accomplish many difficult welding operations, such as overhead welding, by simply adjusting the power source. Even the most amateur weldor is able to make good welds the first time because of power source automatic adjustment.

Various modes of carrying out the invention are contemplated as being within the scope of the following claims particularly pointing out and distinctly claiming the subject matter which is regarded as the invention.

I claim:

1. A welding power source for providing an alternating square wave current for arc welding comprising, a first direct current transformer rectifier unit having control means for adjusting the voltage and amperage output thereof, a second direct current transformer rectifier unit connected in circuit with the first transformer rectifier unit, said first and second transformer rectifier units being electrically connected in the circuit at opposite polarities, an electronic control circuit for triggering said first and second transformer rectifier units alternately from full-off to full-on conducting, program means connected to said electronic control circuit for varying the duration of each opposite polarity full-on conducting period of said first and second transformer rectifier units, and a plurality of controlled rectifier units included in said electronic control circuit to establish the opposite polarity conducting periods of the first and second transformer rectifier units, said controlled rectifier units being operatively connected to said control circuit so that a preprogrammed sequence of power pulses are supplied to the arc, successive pulses in said sequence being of distinct duration, voltage, and amperage independent of any other pulse in the sequence, and determined solely by the program.

2. The apparatus of claim 1 in which the controlled rectifiers are silicon controlled rectifiers.

3. In a welding power source including a continuous, consumable electrode, said power source providing a preprogrammed sequence of positive and negative power pulses of a generally alternating square wave shape and comprising, direct current supply means capable of producing a range of amperages and voltages, and rapid response control means electrically connected to said direct current supply means for rapidly switching said supply means from a full positive conducting condition to a full negative conducting condition in any predetermined sequence of pulse duration, amperage and voltage within the operating range of said direct current supply means, thereby providing a fully automatic electrical control system for consumable electrode arc welding.

4. The apparatus of claim 3, in which the rapid response control means comprises a trigger circuit including a bistable multivibrator capable of delivering variable duration pulses, a plurality of small silicon controlled rectifiers having gates connected in circuit with said trigger circuit, said gates being responsive to signals generated by said trigger circuit, and a plurality of relatively larger current control devices disposed in controlling relationship with said direct current supply means and actuated by said trigger circuit to provide a predetermined sequence of power pulses to said consumable electrode.

5. An electric power supply for generating an infinitely adujstable square wave alternating current for consumable electrode arc welding comprising a source of constant potential direct current connected to said power supply to provide opposite polarity current pulses to the eletcrode, a control circuit electrically connected to said source of constant potential direct current, said control circuit having positive and negative networks for controlling the opposite polarity pulses from said source, each half of said control circuit including a plurality of relatively small paralleled controlled rectifiers, a plurality of small pulse transformers associated with said small paralleled controlled rectifiers, a plurality of commutating capacitors in circuit with said pulse transformers and said small controlled rectifiers, a plurality of paralleled, larger load current controlled rectifiers, a plurality of larger load pulse transformers associated with one of the small controlled rectifiers and operated thereby, each load pulse transformer having its primary winding in circuit with an opposite polarity load current controlled rectifier to turn on said opposite polarity load current controlled rectifier in response to a signal from the small controlled rectifier associated with the load pulse transformer primary winding, each load current controlled rectifier being disposed in circuit with one of said small controlled rectifiers and one of said commutating capacitors, said small controlled rectifier thereby providing a turn-off signal to turn off said load current controlled rectifier by back biasing it with a discharge from the associated commutating capacitor, electrical means connecting one of said load current controlled rectifiers to the primary winding of the load pulse transformer in the opposite half of the circuit to provide a signal for turning on the opposite plurality of paralleled load current controlled rectifiers in response to the turn-off signal from the small controlled rectifier associated with said load current controlled rectifier, and means for adjusting the length of the conducting period of said load current controlled rectifiers, separate means for adjusting the conducting voltage of said power supply, and separate means for adjusting the amperage range of said power supply whereby an infinitely adjustable square wave alternating current is provided for consumable electrode arc welding.

6. The apparatus of claim 5 wherein said controlled rectifiers are silicon controlled rectifiers.

7. The apparatus of claim 6 wherein said direct current power supply comprises a pair of constant potential, direct current transformer rectifiers disposed in circuit with said control circuit to be alternately energized in sequence to provide opposite polarity pulses to the consumable electrode.

8. The apparatus of claim 5, wherein the commutating capacitors associated with the respective load current controlled rectifiers back bias the load current controlled rectifiers to insure turn off and also provide a turn on pulse to the primary winding of the load pulse transformer associated with the opposite half of the circuit to turn on the opposite polarity load current controlled rectifiers only after the charge carriers have cleared the junctions of the back biased load current controlled rectifiers.

9. A control circuit for controlling electric power to a common load comprising positive and negative networks for controlling opposite polarity pulses from a source and being conducted to the common load, each half of said control circuit including controlled rectifier means for controlling the conduction of power from the corresponding network to the load, a pulse transformer means associated with each controlled rectifier means, commutating capacitor means in circuit with said pulse transformer means and said controlled rectifier means, and control signal means providing a sequence of signals to the pulse transformer means, each pulse transformer means having its primary winding in circuit with an opposite polarity controlled rectifier means to turn on said opposite polarity controlled rectifier means in response to a signal from the pulse transformer means in the opposite polarity half of said circuit while said pulse transformer means is simultaneously providing the same pulse to turn off its associated controlled rectifier means, whereby the controlled rectifier means in only the negative or positive half of the circuit can be conducting at one instant of time.

10. A positive control means for a controlled rectifier switch means which are connected to alternately power a load, comprising a first controlled rectifier means in a first network, a first commutating capacitor means associated with said first controlled rectifier means to back bias said rectifier means to insure turn-off, a second controlled rectifier means in a second network, pulse transformer means in said second network associated with said second controlled rectifier means, and circuit means connecting said first commutating capacitor means to said pulse transformer means to conduct a turn on pulse to said second controlled rectifier means from said commutating capacitor means only after said first commutating capacitor means has back biased and turned off its associated first controlled rectifier means, whereby simultaneous conduction by said first and second controlled rectifier means is effectively prevented.

References Cited
UNITED STATES PATENTS

| | | | |
|---|---|---|---|
| 3,068,352 | 12/1962 | Correy | 219—137 |
| 3,103,616 | 9/1963 | Cole et al. | 321—45 |
| 3,131,343 | 4/1964 | Reinert | 321—45 X |

OTHER REFERENCES

Interval Timer for High Level Output, Solid/State/Design Application Note, p. 42, February 1962.

JOHN F. COUCH, *Primary Examiner.*

W. H. BEHA, *Assistant Examiner.*